United States Patent
Lin

(10) Patent No.: US 8,371,631 B2
(45) Date of Patent: Feb. 12, 2013

(54) RECONFIGURABLE TOOL MODULE FOR AN END-EFFECTOR EMPLOYED WITH A ROBOTIC ARM

(75) Inventor: Yhu-Tin Lin, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/101,186

(22) Filed: May 5, 2011

(65) Prior Publication Data

US 2012/0280526 A1  Nov. 8, 2012

(51) Int. Cl.
B66C 1/02  (2006.01)
(52) U.S. Cl. ............................ 294/65; 294/186; 901/40
(58) Field of Classification Search .................. 294/186, 294/65, 183; 414/737, 744.8, 752.1; 901/40
See application file for complete search history.

(56) References Cited

U.S. PATENT DOCUMENTS

| | | | |
|---|---|---|---|
| 4,593,947 A * | 6/1986 | Yocum | 294/187 |
| 4,770,456 A | 9/1988 | Phillips et al. | |
| 5,079,903 A * | 1/1992 | Hakansson | 53/473 |
| 5,777,267 A | 7/1998 | Szydel | |
| 5,833,147 A | 11/1998 | Fuhlbrigge | |
| 6,457,759 B1 * | 10/2002 | Unokuchi | 294/186 |
| 6,471,189 B2 | 10/2002 | Karlinger | |
| 7,422,031 B2 | 9/2008 | Benson et al. | |
| 7,622,001 B2 | 11/2009 | Inada et al. | |
| 7,790,984 B2 | 9/2010 | Choi | |
| 2009/0194922 A1 | 8/2009 | Lin et al. | |
| 2009/0292298 A1 * | 11/2009 | Lin et al. | 606/130 |
| 2010/0140969 A1 | 6/2010 | Lin et al. | |
| 2010/0180711 A1 | 7/2010 | Kilibarda et al. | |
| 2010/0234994 A1 | 9/2010 | Shi | |

* cited by examiner

Primary Examiner — Saul Rodriguez
Assistant Examiner — Gabriela Puig

(57) ABSTRACT

A reconfigurable tool module for an end-effector includes an adjustable-height housing attached to a swing arm. The adjustable-height housing includes a valve spool and a flow path terminating at a workpiece interface tool. The valve spool is configured to interrupt the flow path when the adjustable-height housing is in a first position. The valve spool is configured to open the flow path when the adjustable-height housing moves away from the first position.

13 Claims, 3 Drawing Sheets

RECONFIGURABLE TOOL MODULE FOR AN END-EFFECTOR EMPLOYED WITH A ROBOTIC ARM

TECHNICAL FIELD

This disclosure is related to end-effectors for use with a robotic arm.

BACKGROUND

The statements in this section merely provide background information related to the present disclosure and may not constitute prior art.

Known end-effectors attach to robotic apparatuses to manipulate a workpiece during manufacturing processes. An end-effector may grasp a workpiece using tool modules, transport the workpiece to a new location, and orient and release the workpiece. The end-effector is preferably adjustable to permit utilization with workpieces of multiple designs, including adjusting the tool modules. It is known to adjust an end-effector for use with workpieces of multiple designs by manually adjusting tool modules of the end-effector. Manually adjusting the tool modules of the end-effector is known to consume time and may be prone to errors. Applications of robotic apparatuses with end-effectors may encompass material handling, manufacturing, packaging, and testing.

Known workpieces handled by an end-effector include parts or sheet metal panels that are shaped in three-dimensional forms and have large changes of slope and elevation. It may be impractical to design an end-effector with excessively large height extension and swivel angle for tool modules that self-conform to a workpiece.

A reconfigurable end-effector for material handling, such as pick-and-place of sheet metal panels in a stamping operation includes a plurality of tool modules with workpiece interface tools, e.g., vacuum cups that may be configured to different locations on the end-effector frame to interact with workpieces having varying geometries and sizes. Some of the tool modules may not be engaged when interacting with some workpieces due to size or geometry of the workpiece. A redundant tool module may be moved on the reconfigurable end-effector to avoid interferences. Known methods and systems for disabling power to a redundant workpiece interface tool include equipping each of the tools with a separate controllable vacuum supply, which adds components and an associated control system. A redundant workpiece interface tool may instead be removed, increasing setup time.

SUMMARY

A reconfigurable tool module for an end-effector includes an adjustable-height housing attached to a swing arm. The adjustable-height housing includes a valve spool and a flow path terminating at a workpiece interface tool. The valve spool is configured to interrupt the flow path when the adjustable-height housing is in a first position. The valve spool is configured to open the flow path when the adjustable-height housing moves away from the first position.

BRIEF DESCRIPTION OF THE DRAWINGS

One or more embodiments will now be described, by way of example, with reference to the accompanying drawings, in which.

DETAILED DESCRIPTION

Figure 1:
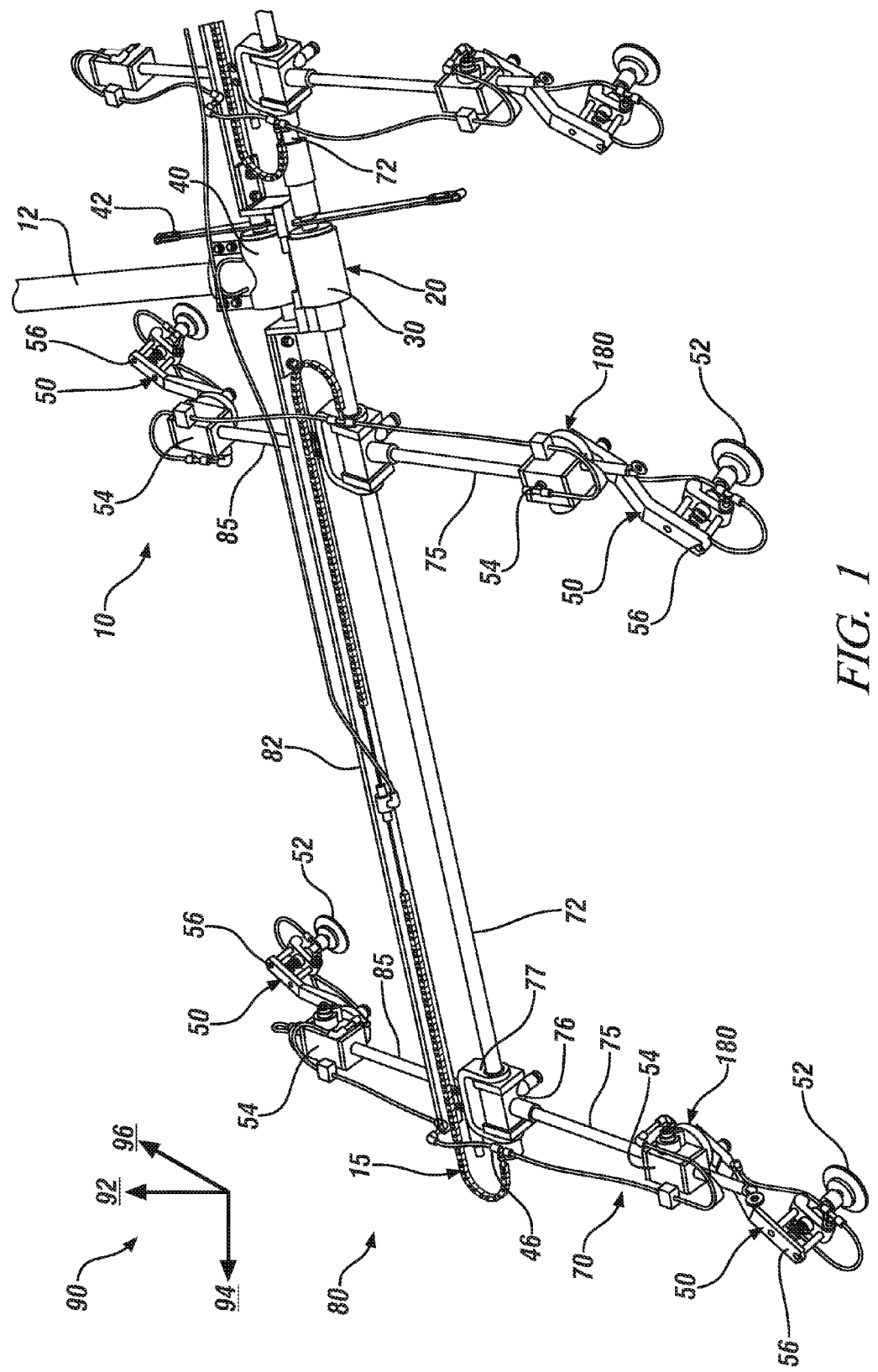
FIG. 1 illustrates a portion of a reconfigurable end-effector including a plurality of configurable tool modules in accordance with the disclosure.

Referring now to the drawings, wherein the showings are for the purpose of illustrating certain exemplary embodiments only and not for the purpose of limiting the same, FIG. 1 illustrates a portion of a reconfigurable end-effector 10 including a plurality of configurable tool modules 50. The end-effector 10 includes a master boom 12 that attaches to a free end of an articulable robotic arm or another material handling device. In one embodiment, the robotic arm includes a programmable device attached to a base and operative to linearly and rotationally translate the end-effector 10 in space. The robotic arm includes a power source, e.g., a vacuum source that is controllably channeled across the end-effector 10 to workpiece interface tools 52 of each of the tool modules 50 via a reconfigurable conduit system 15. A spatial coordinate system described with reference to an x-y-z reference coordinate system 90 including x-axis 92, y-axis 94, and z-axis 96 provides position reference for the end-effector 10 and attached tool modules 50. The end-effector 10 is preferably machine-adjusted to a preferred configuration, which defines location of each of the tool modules 50 in relation to the x-y-z coordinate system 90.

The reconfigurable end-effector 10 is preferably arranged in a spider-frame configuration that includes a first branch assembly 70 located in a nominal front position (as shown) and a second branch assembly 80 located in a nominal rear position (as shown). A spider-frame configuration includes a limb having one or more branches providing the structural support for the tool modules 50, wherein the branches are attached to the limb element in a cantilever fashion. The first and second branch assemblies 70, 80 each structurally support one or a plurality of the tool modules 50. As described herein, the first and second branch assemblies 70, 80 are moveable and may be arranged in any of a convex configuration, a concave configuration, or a flat configuration to permit the tool module(s) 50 to attach to or interact with a workpiece. As such the articulable robotic arm may employ the reconfigurable end-effector 10 to physically move a workpiece or perform an operation on a workpiece, depending upon specific operating scheme of the tool module(s) 50.

The master boom 12 couples to a dual articulation mechanism 20 to articulate the first and second branch assemblies 70, 80. The dual articulation mechanism 20 includes a first rotary clutch mechanism 30 and a second rotary clutch mechanism 40. A longitudinal centerline of the master boom 12 defines the x-axis 92 of the x-y-z reference coordinate system 90.

The first branch assembly 70 attaches to the first rotary clutch mechanism 30. The first branch assembly 70 includes a pair of limbs 72 that project from the first rotary clutch mechanism 30 in opposite directions, preferably orthogonal to its longitudinal axis. Longitudinal projections of the limbs 72 preferably define the y-axis 94 of the of x-y-z reference coordinates 90. The z-axis 96 is defined perpendicular to a plane defined by the x-axis 92 and the y-axis 94. Front branches 75 couple via linear locking mechanisms 76 to one of the limbs 72, preferably projecting orthogonally therefrom. The front branches 75 are configured to rotate with rotation of the limbs 72. The pair of limbs 72 are preferably linked to rotate in concert with each other through the first rotary clutch mechanism 30.

The second branch assembly 80 attaches to the second rotary clutch mechanism 40. The second branch assembly 80 includes a pair of guide rails 82 that project from the second rotary clutch mechanism 40 parallel to the limbs 72 of the first branch assembly 70. Each of the guide rails 82 is formed using a single beam element, which is preferably an I-beam that includes a top flange portion and a bottom flange portion coupled via a web portion.

Rear branches 85 attach to corresponding front branches 75 and limbs 72 via yokes 77 that are connected to the corresponding linear locking mechanism 76, are slidably coupled to one of the guide rails 82, and preferably project orthogonal to the guide rails 82.

The rear branches 85 are configured to rotate with rotation of the guide rails 82. The guide rails 82 are preferably linked to rotate in concert with each other through the second rotary clutch mechanism 40. The front branches 75 and rear branches 85 are fabricated from suitable material and include one or a plurality of longitudinal splines. Each of the front branches 75 and rear branches 85 has at least one tool module 50 slidably mounted thereon. Ends of the limbs 72 distal to the first rotary clutch mechanism 30 couple to a corresponding end of one of the guide rails 82 distal to the second rotary clutch mechanism 40 using an end bracket 46. Preferably the end brackets 46 are fixedly connected to the ends of the guide rails 82 and rotatably connected to the ends of the limbs 72, thus permitting the limbs 72 to rotate therein.

The yoke 77 translates along the spline shaft of the respective limb 72 in concert with the linear locking mechanism 76. The yoke 77 including the rear branch 85 translates along the guide rail 82. The yoke 77 is free to rotate around the spline shaft of the respective limb 72, allowing the rear branch 85 to rotate independently with respect to the corresponding front branch 75. Rotation of the yoke 77 and associated rear branch 85 is constrained by rotational position of the guide rail 82, which is controlled by the second rotary clutch mechanism 40 using the second input lever 42. The front and rear branches 75, 85 are configured to translate along the length of the respective limb 72 when the linear locking mechanism 76 is unlocked.

Each tool module 50 may mount onto a linear/rotary locking mechanism 54 that slidably mounts on one of the front and rear branches 75, 85, and interacts with the longitudinal splines thereof to prevent rotation about a longitudinal axis of the respective branch 75, 85. The linear/rotary locking mechanism 54 is configured to translate on the respective branch 75, 85 when unlocked and to secure the tool module 50 at a preferred location along the length of the respective branch 75, 85 when locked. Each linear/rotary locking mechanism 54 is preferably pneumatically activated, is preferably configured to remain in a locked position until unlocked, and may be unlocked only when compressed air is injected. Each tool module 50 includes a swing-arm assembly 56 that allows the tool module 50 to be reconfigured in preferred positions to interact with different workpieces.

Each tool module 50 preferably has five degrees of freedom (5-d.o.f.) of movement, and is configurable to a suitable position for its associated workpiece interface tool 52 defined with reference to an x-axis position, a y-axis position, a z-axis position, a rotational angle $\phi$ about the z-axis of the x-y-z coordinate system 90, and a swivel angle $\alpha$. The foregoing details of the spider-frame configuration of the end-effector 10 are illustrative.

The reconfigurable conduit system 15 is a flexible dress package that is arranged on and attached to selected elements of the end-effector 10 to facilitate reconfiguration thereof. The reconfigurable conduit system 15 channels power from a remote vacuum source to each of the workpiece interface tools 52 of the tool modules 50, preferably coincidently, thus allowing the workpiece interface tools 52 to simultaneously grip or release a workpiece. In one embodiment an actuator, e.g., a solenoid-controlled valve is controllable to simultaneously apply or interrupt vacuum between the power source and the workpiece interface tools 52. The descriptions herein include references to conduit portions, which are preferably flexible tube portions formed from nylon or other suitable material for transferring vacuum. Other conduit portions may instead be considered.

Figure 2:
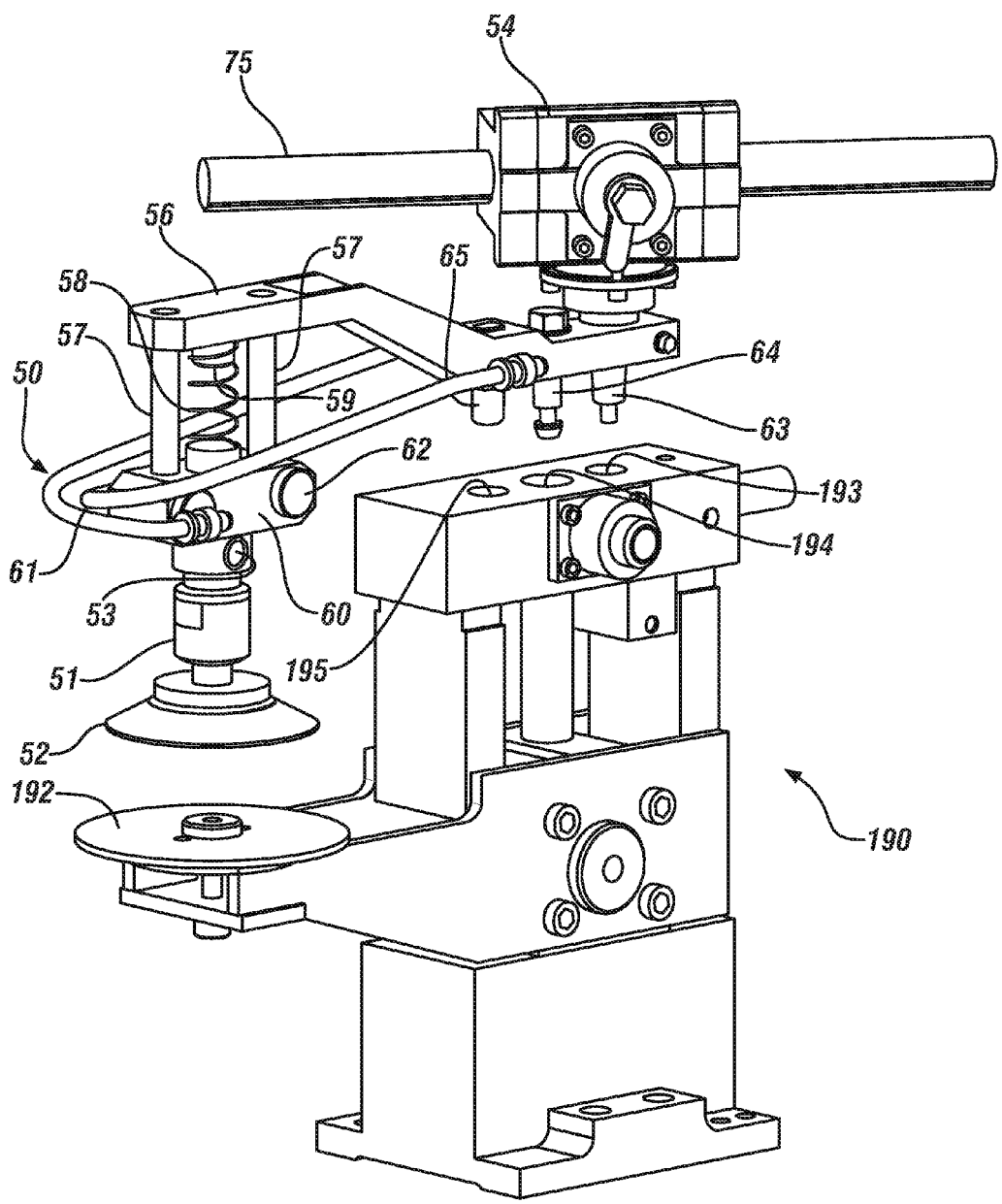
FIG. 2 illustrates a tool module and an associated setup tool in accordance with the disclosure.

FIG. 2 illustrates an embodiment of the tool module 50 and an associated setup tool 190. The tool module 50 mounts onto the linear/rotary locking mechanism 54 slidably mounted on one of the front and rear branches 75, 85. The tool module 50 includes the swing-arm assembly 56 that is attached to the linear/rotary locking mechanism 54 at output shaft 63, and a latching post 64 and a compressed air nipple 65. The setup tool 190 includes a shaft receiver 193, latching post receiver 194, and compressed air source 195, which correspond to the output shaft 63, the latching post 64, and the compressed air nipple 65, respectively when the setup tool 190 interacts with the tool module 50 during execution of a setup procedure. The setup tool 190 includes a moveable cup pad assembly 192 that is configured to translate longitudinally on the setup tool 190 in response to a setup command.

The swing-arm assembly 56 extends laterally from the linear/rotary locking mechanism 54 and is configured to rotate about the output shaft 63 when it is unlocked therefrom. A distal end of the swing-arm assembly 56 includes a pair of parallel guide rods 57 projecting therefrom preferably in a z-axis orientation. A housing 60 slidably mounts on the parallel guide rods 57. The compressed air nipple 65 fluidly connects via air hoses 61 to a pair of locking mechanisms 62 of the housing 60. The housing 60 is held in a fixed z-axis position on the guide rods 57 when the locking mechanisms 62 are locked, and is configured to translate on the guide rods 57 when the locking mechanisms 62 are unlocked. The locking mechanisms 62 are unlocked by application of compressed air, which may originate from the setup tool 190 from the compressed air source 195 via the compressed air nipple 65 during reconfiguration.

The swing arm assembly 56 includes a plunger 59 preferably located between the parallel guide rods 57. A compression spring 58 is located between the swing arm assembly 56 and the housing 60, and applies spring force therebetween. The housing 60 is configured to mount a swivel 51 to which the workpiece interface tool 52 is coupled.

Figure 3:
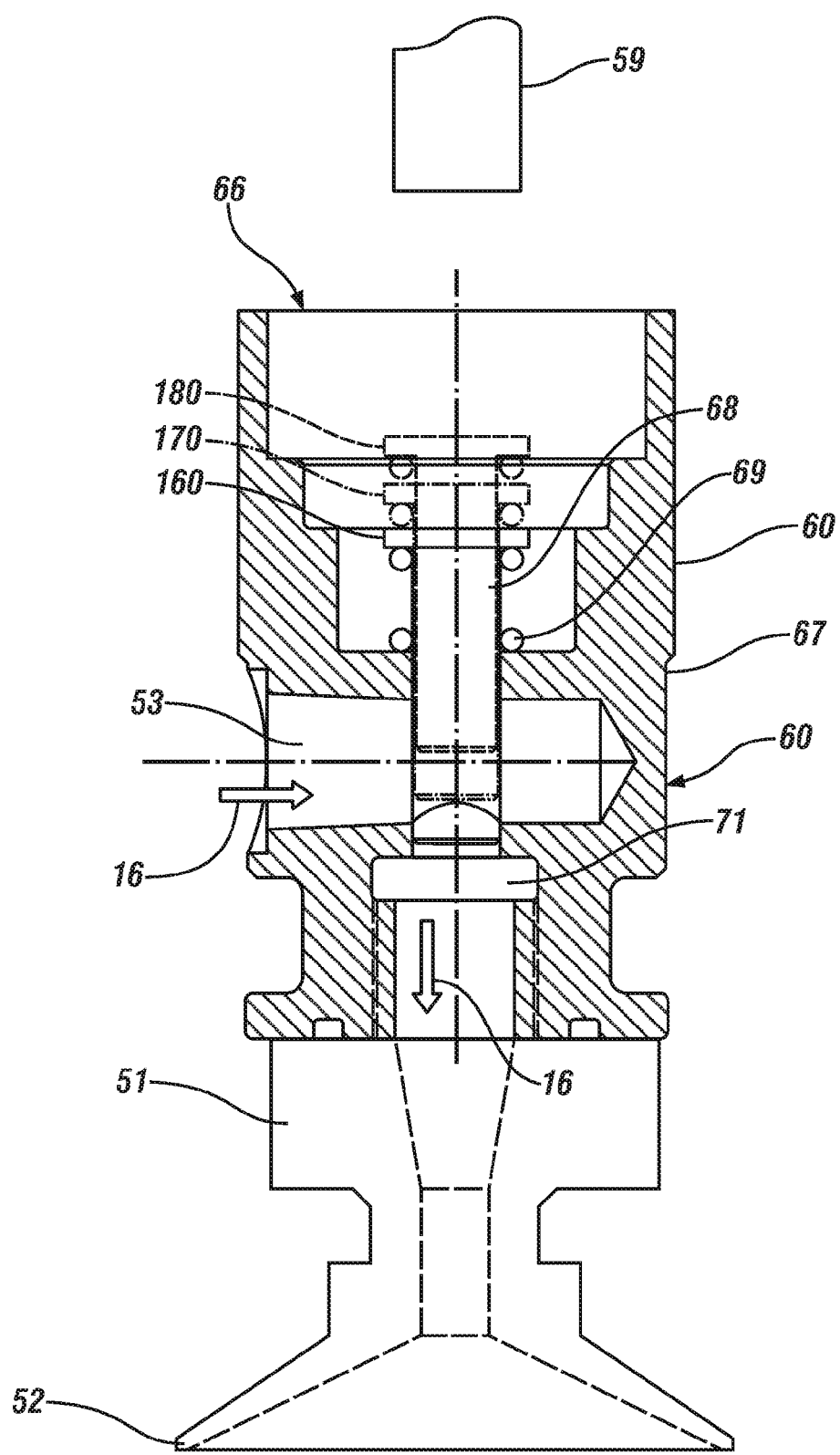
FIG. 3 illustrates a vacuum shutoff mechanism in accordance with the disclosure.

FIG. 3 illustrates the housing 60 including the vacuum port 53, a flow path 16 and a vacuum shutoff mechanism 66. The flow path 16 fluidly connects between the vacuum port 53 and an interior surface of the workpiece interface tool 52 via a flow channel in the swivel 51. The vacuum port 53 fluidly couples to a vacuum source via the reconfigurable conduit system 15. The vacuum shutoff mechanism 66 is configured to interrupt and thus shut off vacuum in the flow path 16 under specific conditions.

The vacuum shutoff mechanism 66 includes a valve body 67 formed in the housing 60 containing a moveable valve spool 68 and an accompanying compression spring 69. When the valve spool 68 is moved to a first position 160, the valve spool 68 shuts off the flow path 16 between the vacuum port 53 and the workpiece interface tool 52, thus interrupting vacuum to the workpiece interface tool 52. When the valve spool 68 is moved away from the first position 160, the valve spool 68 no longer shuts off the flow path 16 between the vacuum port 53 and the workpiece interface tool 52, and vacuum may be applied to the workpiece interface tool 52. The compression spring 69 prevents the valve spool 68 from being drawn into the valve body 67 when vacuum is applied with the valve spool 68 moved away from the first position 160.

The setup tool 190 is operative to move the valve spool 68 to the first position 160 during execution of a setup procedure to disable power thereto when the tool module 50 is redundant or otherwise not necessary or useable to engage a workpiece. It is appreciated that a robotic arm may be employed to manipulate the setup tool 190 to engage the tool module 50 during reconfiguration of the reconfigurable end-effector 10.

Execution of a setup procedure that includes enabling or disabling the tool module 50 is described with reference to FIGS. 2 and 3. The shaft receiver 193, latching post receiver 194, and compressed air source 195 engage the corresponding output shaft 63, latching post 64, and compressed air nipple 65 of the tool module 50 to begin execution of a setup procedure. Compressed air is supplied through the compressed air nipple 65 to unlock the pair of locking mechanisms 62 of the housing 60.

When the locking mechanisms 62 are unlocked, force of the compression spring 58 acts on the housing 60, causing it to translate on the guide rods 57 until the workpiece interface tool 52 rests on the moveable cup pad assembly 192 of the setup tool 190. The setup tool 190 is configured to move the moveable cup pad assembly 192 to adjust the z-axis location of the workpiece interface tool 52 of the tool module 50.

When a setup procedure includes disabling power to the tool module 50, the moveable cup pad assembly 192 applies force to move the workpiece interface tool 52, thus translating the housing 60 on the guide rods 57 towards the swing arm assembly 56, compressing the compression spring 58. When the housing 60 approaches the swing arm assembly 56, the plunger 59 interferes with the valve spool 68, causing it to discontinue moving. The housing 60 continues to move with the movement of the moveable cup pad assembly 192 until stopped by interference with the swing arm assembly 56. The valve spool 68 is moved to the first position 160 thereby. Compressed air to the pair of locking mechanisms 62 is discontinued, causing them to engage the guide rods 57 and lock the housing 60 into position with the valve spool 68 in the first position 160. Thus the tool module 50 is disabled with vacuum to the workpiece interface tool 52 interrupted by the positioning of the valve spool 68 at the first position 160 in the valve body 67. The valve spool 68 shuts off the flow path 16 between the vacuum port 53 and the workpiece interface tool 52.

Engaging the tool module 50 subsequent to disablement includes a reverse execution of the setup procedure with the housing 60 positioned on the guide rods 57 at a position that is away from the swing arm assembly 56. Compressed air is provided to the pair of locking mechanisms 62, causing them to disengage the guide rods 57 and unlock the housing 60. Spring force exerted by the compression spring 58 urges the housing 60 to translate on the guide rods 57. Coincidently, spring force exerted by the valve spring 69 acting on the valve spool 68 urges the valve spool 68 out of the housing 60, thus permitting applied vacuum to pass through the valve body 67 and the swivel 51 to the workpiece interface tool 52. When the housing 60 translates on the guide rods 57 to a preferred position, e.g., to a new setup position of the tool module 50, the compressed air to the locking mechanisms 62 is decoupled to lock the housing 60 at the preferred position. During ongoing operation with the tooling module 50 in a preferred position and able to engage a workpiece, the valve spool 68 interacts with a plug mechanism 71 in a lower portion of the body 60. When vacuum is applied in the flow path 16 without a workpiece present at the workpiece interface tool 52, the plug mechanism 71 may be drawn to a closed position with the valve spool 68 shown in position 180, with the spring force of spring 69 controlling position of the valve spool 68. When vacuum is applied in the flow path 16 with a workpiece present at the workpiece interface tool 52, the valve spool 68 urges the plug mechanism 71 to an open position as shown in position 170. The vacuum force is insufficient to overcome the spring force of spring 69 to move the valve spool 68 to the closed position. Thus the tool module 50 is enabled, with the flow path 16 between the vacuum port 53 and the workpiece interface tool 52 opened by the positioning of the valve spool 68 away from the first position 160 in the valve body 67.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A reconfigurable tool module for an end-effector, comprising:
    an adjustable-height housing attached to a swing arm;
    the adjustable-height housing including a valve spool and a flow path terminating at a workpiece interface tool;
    the valve spool configured to interrupt the flow path when the adjustable-height housing is in a first position and to open the flow path when the adjustable-height housing moves away from the first position;
    wherein the adjustable-height housing is slidably attached to guide rods projecting from the swing arm; and
    wherein the adjustable-height housing further comprises a locking mechanism configured to interact with the guide rods to secure the workpiece interface tool at a predetermined height relative to the swing arm.

2. The reconfigurable tool module of claim 1, wherein the valve spool is configured to interact with a plunger projecting from the swing arm to interrupt the flow path.

3. The reconfigurable tool module of claim 1, wherein the adjustable-height housing is connected to the workpiece interface tool via a swivel mechanism.

4. The reconfigurable tool module of claim 1, wherein the valve spool is configured to interrupt a vacuum to the workpiece interface tool when the adjustable-height housing is in the first position.

5. The reconfigurable tool module of claim 1, wherein the valve spool is configured to permit a vacuum to the workpiece interface tool when the adjustable-height housing moves away from the first position.

6. A reconfigurable tool module for an end-effector attachable to a robotic arm, comprising:
    an adjustable-height housing attached to an arm coupled to the end-effector;
    the adjustable-height housing including a valve body and a valve spool;
    the adjustable-height housing coupled via a flow path to a workpiece interface tool;
    the valve spool configured to interrupt vacuum to the workpiece interface tool when the adjustable-height housing is in a first position and to permit vacuum to the workpiece interface tool when the adjustable-height housing moves away from the first position;
wherein the adjustable-height housing is slidably attached to parallel guide rods projecting from the arm; and
wherein the adjustable-height housing further includes a locking mechanism configured to interact with the parallel guide rods to secure the workpiece interface tool at a predetermined height relative to the arm.

7. The reconfigurable tool module of claim 6, wherein the valve spool is configured to interact with a plunger projecting from the arm to interrupt the vacuum to the workpiece interface tool when the adjustable-height housing is in the first position.

8. The reconfigurable tool module of claim 6, wherein the adjustable-height housing is coupled via the flow path and a swivel mechanism to the workpiece interface tool.

9. A tool module for an end-effector, comprising:
a housing slidably mounted on guide rods projecting from an arm;
the housing including a valve spool, a flow path terminating at a workpiece interface tool, and a locking mechanism configured to interact with the guide rods to secure the housing at a preferred location on the guide rods relative to the arm;
the valve spool configured to interrupt the flow path when the housing is in a first position; and
the valve spool configured to open the flow path when the housing moves away from the first position.

10. The tool module of claim 9, wherein the valve spool is configured to interact with a plunger projecting from the arm to interrupt the flow path when the housing is in the first position.

11. The tool module of claim 10, wherein the locking mechanism is configured to interact with the guide rods to secure the housing in the first position.

12. The tool module of claim 9, wherein the valve spool is configured to interrupt vacuum to the workpiece interface tool when the housing is in the first position.

13. The tool module of claim 9, wherein the valve spool is configured to permit vacuum to the workpiece interface tool when the housing moves away from the first position.

* * * * *